(No Model.)
J. G. A. KITCHEN.
PNEUMATIC TIRE.
No. 556,933.
Patented Mar. 24, 1896.
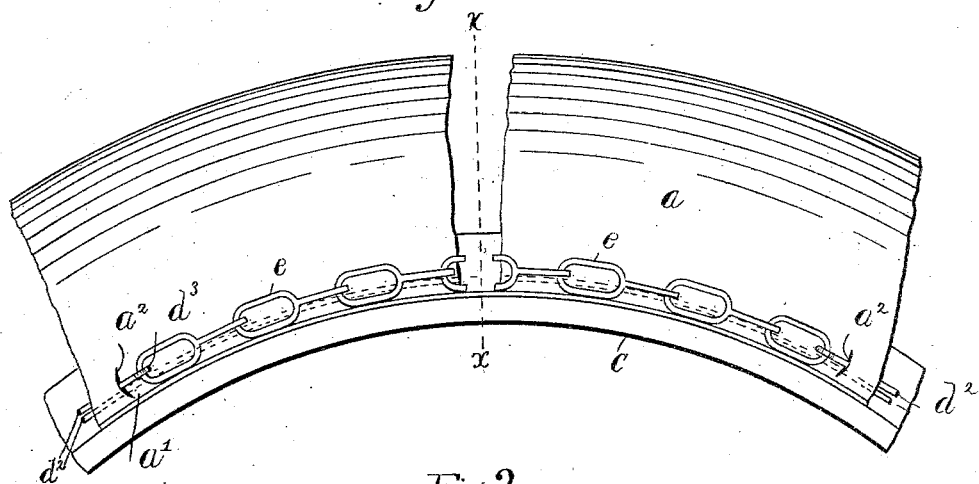
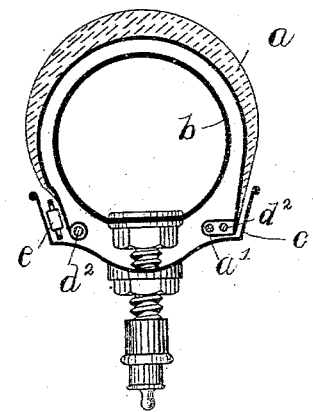
WITNESSES:
Henry F Dobbin.
Estelle M Titus.
INVENTOR
J. G. A. Kitchen
BY
Edward P. Thompson
ATTORNEY.

UNITED STATES PATENT OFFICE.

JOHN GEORGE AULSEBROOK KITCHEN, OF MANCHESTER, ENGLAND.

PNEUMATIC TIRE.

SPECIFICATION forming part of Letters Patent No. 556,933, dated March 24, 1896.

Application filed July 31, 1895. Serial No. 557,690. (No model.)

*To all whom it may concern:*

Be it known that I, JOHN GEORGE AULSEBROOK KITCHEN, a subject of the Queen of Great Britain, and a resident of Manchester, in the county of Lancaster, England, have invented certain new and useful Improvements in Pneumatic Tires, of which the following is a specification.

This invention relates to pneumatic tires having detachable covers or tread portions fitted with wire bands for securing them in channeled fellies and separate air tubes or chambers fitted with inflating and retaining valves.

The object of this invention is the quick and secure attachment of the tire to the felly.

The invention consists in the improved manner of taking up the slack portion of each band necessary to enable the band to pass over the rim of the channel after the edge of the cover has been passed over the rim of the channel, so that the cover shall remain secure in the felly.

The carrying out of my invention will be more readily understood by reference to the sheet of drawings attached hereunto.

In the drawings, Figure 1 represents a portion of the tire and felly, showing the means by which the band is enlarged and contracted, the front side of the portion of felly shown being removed. Fig. 2 represents a section of the tire and felly through the line $x\,x$. Fig. 3 represents an edge view of the chain used as a means for contracting and enlarging the band.

It will be observed that from the illustration the cover $a$ is of the usual horseshoe section and that the air tube or chamber $b$ and the felly $c$ are both formed of the well-known forms. The edge $a'$ of the cover is formed at each side into a pocket or is tubular, and into each pocket is passed a wire or other band $d^2$, which makes almost two complete coils, the ends $d^3$ of the wire passing out of the cover at openings $a^2$ and being formed as loops, the distance between the points at which the ends of the bands emerge from the pocket being according to the size of the felly. A distance equal to about the radius of the felly would be sufficient in many cases. When the band $d^2$ is so contracted that it will grip the felly in the position shown, the space between the ends $d^3$ of the band is filled in with a length of chain $e$, which is so arranged that its links stand on edge, as shown. This chain is preferably made having wide links arranged in the same plane and small extensions connecting them at right angles, as shown in Fig. 3.

It is obvious that the center of a flat chain on edge resting on a surface is higher than the center of the same chain lying flat and that the chain resists tension from its center. That being so, it follows that when on edge the end lengths of the band are raised from the surface on which they rest when the band is slack, the raising of them causing the band to be contracted sufficiently to prevent the rim of the tire-cover from passing over the rim of the felly. The chain is retained on edge chiefly by the inflation of the tire, which causes the cover to press it against the side of the felly, as shown in Fig. 2.

In Fig. 2, which is a section through line $x\,x$, it will be observed that at only one side is the chain $e$ shown. This is done partly in order to show the disposition of the coils of the wire band in the pocket of the cover in the one view and partly because it is usual to arrange the slackening devices or detaching means at opposite parts of the periphery of the wheel.

I do not confine myself to the particular construction of chain as shown in the drawings. Any form or construction of chain which permits of its center being raised sufficiently when twisted or turned axially will do, though a flat chain is always preferable.

The wire part of the band may pass once completely round the edge of the jacket in the pocket or more than once round; but in each case a length of chain outside the edge of the jacket completes the second or third circle or coil.

One side only of the tire-cover may be fitted with a coiled wire band connected at its ends by a flat link chain, as described, and the other side fastened to the rim permanently by a wire in any ordinarily-used manner.

I claim as my invention—

1. A pneumatic tire consisting of an air-tube and a jacket forming the tread portion and having tubular edges, two coiled wire bands one of which is passed through each of said tubular edges with its ends brought to the outside thereof, and two flat link chains one of which connects the ends of each coiled wire band outside the edge of the jacket substantially as and for the purpose set forth.

2. A pneumatic tire consisting of an air-tube and a jacket forming the tread portion and fitted with a coiled wire band in one of its edges, the ends of which band are connected by a flat link chain outside the edge of the jacket, the other edge of the jacket being secured to the rim in a permanent manner.

3. The combination with a pneumatic tire of a flat link chain outside thereof and connecting the ends of a wire inserted into the edge of the tire substantially as and for the purpose set forth.

In testimony whereof I have hereunto set my signature in the presence of two witnesses.

JOHN GEORGE AULSEBROOK KITCHEN.

Witnesses:
R. J. URQUHART,
JAS. WOODS.